United States Patent [19]

Miller

[11] Patent Number: 5,740,806
[45] Date of Patent: Apr. 21, 1998

[54] DYNAMIC RECEIVE APERTURE TRANSDUCER FOR 1.5D IMAGING

[75] Inventor: Gregg Miller, Seattle, Wash.

[73] Assignee: Siemens Medical Systems, Inc., Iselin, N.J.

[21] Appl. No.: 626,241

[22] Filed: Mar. 29, 1996

[51] Int. Cl.⁶ .......................... A61B 86/00; G01N 29/00
[52] U.S. Cl. ........................ 128/661.01; 73/626
[58] Field of Search ................ 128/660.07, 660.01, 128/661.01; 73/625–626; 367/7, 103, 105

[56] References Cited

U.S. PATENT DOCUMENTS

| | | | |
|---|---|---|---|
| 4,235,111 | 11/1980 | Hassler | 73/626 |
| 4,793,184 | 12/1988 | Ikeda et al. | 73/626 |
| 5,097,709 | 3/1992 | Masuzawa et al. | 128/661.01 X |
| 5,132,939 | 7/1992 | Conrad | 367/105 |
| 5,140,558 | 8/1992 | Harrison, Jr. et al. | 367/7 |
| 5,186,175 | 2/1993 | Hirama et al. | 128/661.01 |
| 5,301,168 | 4/1994 | Miller | 128/661.01 X |
| 5,329,930 | 7/1994 | Thomas, III et al. | 128/661.01 |
| 5,351,690 | 10/1994 | Okada et al. | 128/661.01 |
| 5,417,217 | 5/1995 | Morita et al. | 128/661.01 |
| 5,548,564 | 8/1996 | Smith | 367/140 |

*Primary Examiner*—Francis Jaworski

[57] ABSTRACT

An ultrasound imaging system enables 1.5D image information to be generated from a single firing of a linear transducer array by permitting dynamic control over the receive aperture. The imaging system comprises a transducer having a linear array of piezoelectric elements arranged in a plurality of distinct rows of the elements. The transducer is operable to provide acoustic pulses from elements of a first one of the rows in response to respective driving signals and to provide corresponding return signals in response thereto at elements of additional ones of the plurality of the rows and at the first one of the rows. A receiver is coupled to the transducer to receive a summed signal corresponding to the return signals from the elements. The receiver comprises a plurality of low voltage switches that couple to respective ones of the additional ones of the plurality of the rows, and a high voltage switch disposed in series with the low voltage switches. The timing of the high and low voltage switches is controlled to vary the focusing characteristics of the imaging system. A processor coupled to the receiver and the transducer generates a 1.5D image using the summed signal.

14 Claims, 3 Drawing Sheets

DYNAMIC RECEIVE APERTURE TRANSDUCER FOR 1.5D IMAGING

BACKGROUND OF THE INVENTION

1. Field of the Invention

This invention relates to ultrasonic diagnostic imaging, and more particularly, to an ultrasonic imaging system that permits dynamic changes to the receive aperture in order to improve 1.5D image resolution without reducing the operational frame rate.

2. Description of Related Art

Ultrasonic imaging techniques are commonly used to produce diagnostic images of internal features of an object, such as a human anatomy. A diagnostic ultrasonic imaging system for medical use forms images of internal tissues of a human body by electrically exciting an acoustic imaging transducer element or an array of acoustic transducer elements to generate short ultrasonic pulses that travel into the body. The ultrasonic pulses produce echoes as they reflect off of body tissues that appear as discontinuities or impedance changes to the propagating ultrasonic pulses. These echoes return to the imaging transducer, and are converted back into electrical signals that are amplified and decoded to produce a cross-sectional image of the tissues. These ultrasonic imaging systems are of significant importance to the medical field by providing physicians with real-time, high resolution images of the internal features of a human anatomy without resort to more invasive exploratory techniques, such as surgery.

The acoustic imaging transducer which radiates the ultrasonic pulses typically comprises a piezoelectric element or matrix of piezoelectric elements. As known in the art, a piezoelectric element deforms upon application of an electrical signal to produce the ultrasonic pulses. In a similar manner, the received echoes cause the piezoelectric element to deform and generate the corresponding electrical signal. The acoustic imaging transducer is often packaged within a portable or handheld device that allows a sonographer substantial freedom to easily manipulate the imaging transducer over a desired area of interest. The imaging transducer can then be electrically connected via a cable to a central control device that generates and processes the electrical signals. In turn, the control device transmits the image information to a real-time viewing device, such as a video display terminal. The image information may also be stored for later viewing of the diagnostic images.

It is desirable within the ultrasonic imaging art to provide an image that shows anatomical features of a particular region of interest at a certain imaging depth, or elevation, within the patient. One way to provide such an image is to utilize a transducer comprising a two-dimensional array of piezoelectric elements that are individually driven by separate electrical signals. In such a two-dimensional array, the phase and amplitude of the signals applied to individual piezoelectric elements can be controlled in order to produce an ultrasonic wave by the piezoelectric elements that can be focused or steered to the region of interest. The received echoes from the individual ultrasonic waves are then summed together and processed in a manner that yields a net signal characterizing the region of interest within the patient, a process known as beamforming.

Although a two-dimensional array enables highly accurate focusing capability and beam steering in the elevation plane, such systems are also far more complicated to control and operate than a relatively simple one-dimensional or linear array. Moreover, one-dimensional arrays are more commercially available than two-dimensional arrays. Therefore, one-dimensional arrays have been configured to provide limited two-dimensional focusing in order to obtain better elevation plane focusing without the complexity of two-dimensional arrays. The elevation plane focusing is achieved by varying the number of piezoelectric element rows used for receiving ultrasonic information, in contrast to conventional one-dimensional arrays that provided fixed focusing in the elevational plane by transmitting and receiving only from the same row or rows. Such images are also referred to as a 1.5D image since they approximate, but do not quite realize, a two-dimensional (2D) image.

More particularly, in a known method of providing a 1.5D image, the receive aperture of the imaging transducer is enlarged relative to the transmit aperture by applying a driving signal to one row of piezoelectric elements (i.e., the active or center row), and receiving an echo return signal at more than one row of piezoelectric elements (i.e., the passive rows). The echo return signals received at the passive rows distant from the active row provide additional elevation focusing information than the echo return signal received at only the first row. The return signals are then summed to produce a net signal in the beamforming process that provides better image resolution than would ordinarily be obtained from a single passive row.

Within present 1.5D imaging systems, high voltage switches are used to control the operation of the receive aperture. The high voltage switches couple the passive row piezoelectric elements into the receive path in order to recover the echo return signals at those elements. The focusing characteristics of the receive aperture is controlled by varying the switching of the high voltage switches. A significant drawback of such systems is that the high voltage switches change state relatively slowly and produce a large transient signal or "glitch" when they close due to the charge injection characteristics of the switches. If the switches were to close during imaging, a bright artifact would appear on the 1.5D image since the glitches are on the order of 60 to 80 dB above the noise level of the ultrasonic imaging system.

To compensate for this drawback, 1.5D images are built from multiple firings of the active row elements. In a first firing, only the active row elements are coupled to the receive path. In subsequent firings, however, different pairs of the passive rows are coupled into the receive paths by closing respective pairs of the high voltage switches. In this way, the information lost due to the glitches in each firing can be recovered from other firings, with each respective firing providing an incremental amount of additional information. Thus, in the net summed signal resulting from multiple firings, the glitches are sufficiently masked by the information from later firings, and a composite 1.5D image is generated. A significant drawback of this method for generating a 1.5D image is that the frame rate is necessarily reduced due to the need for multiple firings. It is desirable to operate at a highest possible frame rate in order to detect instantaneous changes in the imaging subject and to reduce the overall imaging time.

Thus, a critical need exists for an ultrasound imaging apparatus that enables 1.5D images to be generated by enlarging the receive aperture without resorting to multiple firings that have the effect of reducing the frame rate. Ideally, the imaging apparatus should be compatible with modern handheld ultrasonic imaging transducers that have linear arrays of piezoelectric elements.

SUMMARY OF THE INVENTION

In accordance with the teachings of this invention, an ultrasound imaging system is provided that enables 1.5D image information to be generated from a single firing of a linear transducer array by permitting dynamic control over operation of the receive aperture.

The imaging system comprises a transducer having a linear array of piezoelectric elements arranged in a plurality of distinct rows of the elements. The transducer is operable to provide acoustic pulses from respective elements of a first one of the rows in response to respective driving signals and to provide corresponding return signals in response thereto at respective elements of additional ones of the plurality of the rows and at the first one of the rows. A plurality of low voltage switches are coupled to respective ones of the additional ones of the plurality of the rows, and a high voltage switch is disposed in series with the low voltage switches. The timing of the high and low voltage switches is controlled to vary the focusing characteristics of the imaging system. The return signals are then passively summed and provided to a receiver for beamforming with other like passively summed signals. A processor coupled to the receiver and the transducer forms a 1.5D image from the beamformed signal.

More particularly, the imaging system generates the 1.5D image by emitting a single set of acoustic pulses from the respective elements of the first one of the rows in response to respective driving signals. Corresponding return signals are received in response to the set of acoustic pulses at elements of additional ones of the plurality of the rows and at the first one of the rows. The return signals are coupled from the additional ones of the plurality of the rows and the first one of the rows into a receive path of the imaging system by controlling the high voltage switches and the plurality of low voltage switches. The high voltage switch is closed after the acoustic pulses are emitted. Respective ones of the low voltage switches are then closed in a sequential manner during the receiving step and subsequent to closing of the high voltage switch.

DETAILED DESCRIPTION OF THE PREFERRED EMBODIMENT

Figure 1:
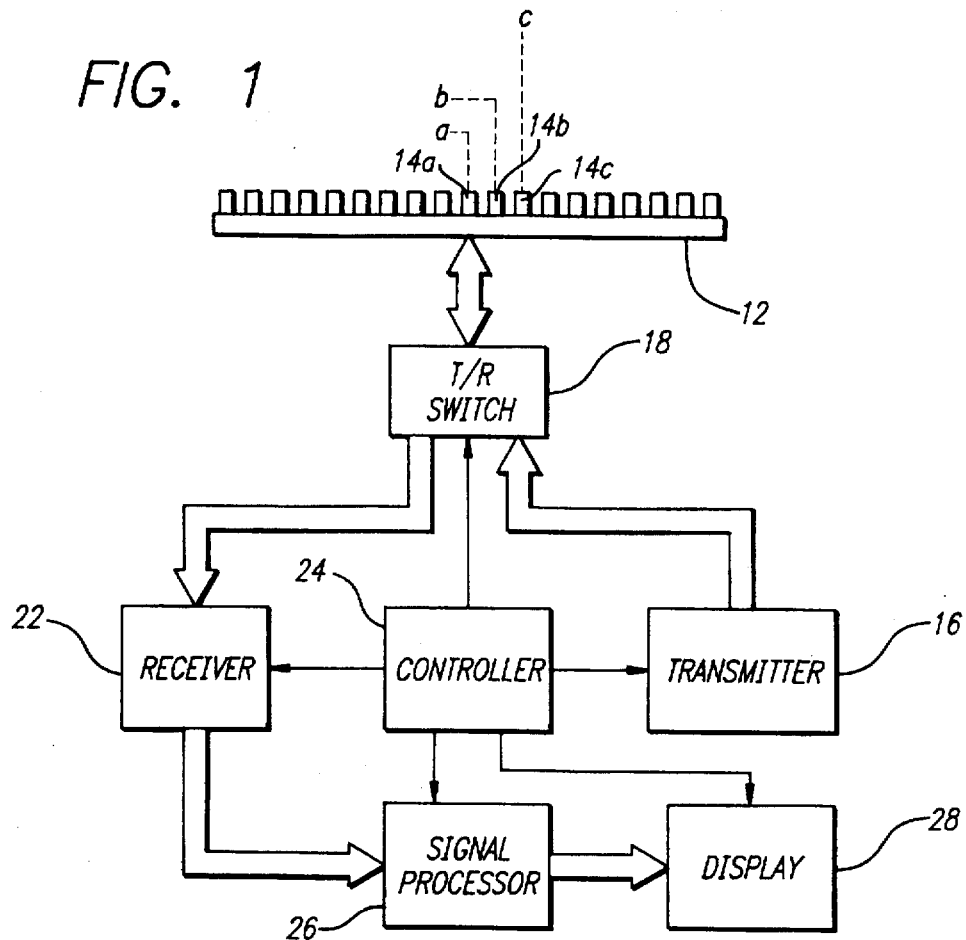
FIG. 1 is a block diagram of an ultrasonic imaging system.

This invention satisfies the critical need for an ultrasound imaging apparatus that enables 1.5D images to be generated by enlarging the receive aperture dynamically without the multiple firings that reduce the frame rate. In the detailed description that follows, like reference numerals are used to describe like elements in one or more of the figures.

Referring first to FIG. 1, a block diagram of an ultrasonic imaging system is provided. The ultrasonic imaging system includes an imaging transducer array 12 comprised of a plurality of rows 14 of separately driven transducer elements. The imaging transducer array 12 comprises a one-dimensional array having a plurality of linearly disposed transducer elements arranged in distinct rows 14. As known in the art, the transducer elements of the center row 14a produces acoustic pulses when energized by an electrical transmit signal provided by a transmitter 16. The acoustic pulses travel through the various tissue layers of the patient, and are then reflected back from a region of interest to the imaging transducer 12 in the form of echo return pulses. The echo return pulses are converted by the imaging transducer 12 back into electrical signals that are routed to a receiver 22. A transmit/receive switch 18 controls the flow of signals from the transmitter 16 to the imaging transducer 12, and prevents the transmit pulses from the transducer from being coupled directly into the receiver 22. The transmitter 16, receiver 22 and transmit/receive switch 18 are operated under the control of a central controller 24 that is responsive to commands by a sonographer that operates the ultrasonic imaging system.

The focusing characteristics of the transducer array 12 is controlled by varying the delay of the signals applied by the transmitter 16 no each of the elements of the imaging transducer 12. By imparting a time delay to the electrical signal pulses provided to the successive transducer elements, the signal pulses cumulatively provide a net ultrasonic beam directed at an angle relative to a plane of the transducer array 12 toward a desired focal point. Progressive changes to the extent of the relative time delays causes the beam angle to change in an incremental manner, thus steering the ultrasonic beam in a desired direction. The echo return pulses from the focal point differ in phase and amplitude due to the differences in the length and medium of the propagation path travelled by the respective acoustic pulses.

The receiver 22 amplifies the echo signals, imparts an appropriate time delay to each one of the echo signals, and sums the delayed echo signals together to provide a single beamformed signal that indicates the total ultrasonic energy reflected from a point along the desired ultrasound direction. The receiver 22 typically includes an analog-to-digital converter that converts each of the analog echo signals into a series of digital values that can be sampled at a predetermined rate. The beamformed signal is then provided to the signal processor 26, which converts the beamformed signals into a data format that can be displayed as a graphical image on the video display terminal 28. The graphical image data may also be stored for later viewing, or printed to a hard-copy image.

Figure 2:
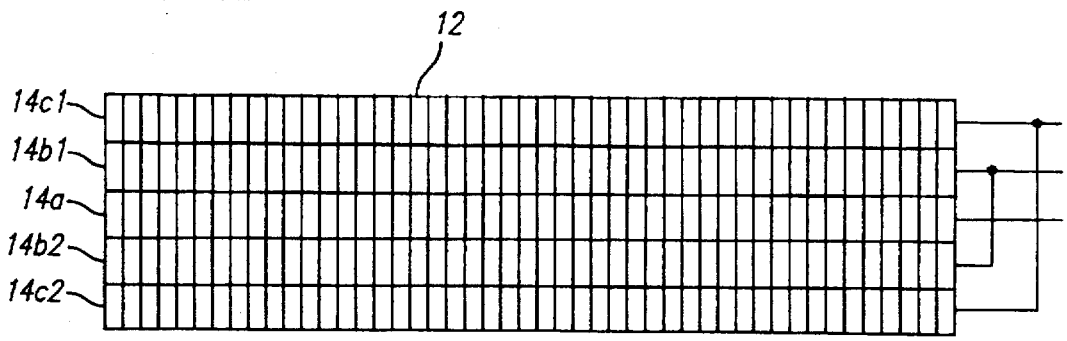
FIG. 2 is a front view of an enlarged portion of the imaging transducer array.

Referring now to FIG. 2 in conjunction with FIG. 1, the imaging transducer array 12 is illustrated in greater detail. The transducer 12 includes a first row 14a extending axially along a central region of the transducer. A second pair of rows 14b1, 14b2 (collectively referred to as rows 14b) are disposed at opposite sides of the central row 14a, and a third set of rows 14c1, 14c2 (collectively referred to as rows 14c) are disposed outwardly of the rows 14b. It should be appreciated that the transducer 12 may include a greater number of additional rows disposed outwardly of the rows 14c1, 14c2. The first row 14a is also known as "elevation 0"; similarly, the second rows 14b are known as "elevation 1" and the third rows 14c are also known as "elevation 2".

The first row 14a operates both as an active row by emitting acoustic signals and as a passive row by receiving acoustic signals, and the additional rows 14b and 14c operate only as passive rows. As described above, the active row 14a is caused to emit an acoustic pulse in response to an electrical signal from the transmitter 16. The acoustic pulse travels into the patient, and reflects off of density discontinuities within an area of interest. In FIG. 1, the reflected acoustic pulse traverses the path illustrated by the phantom line from point a back to the row 14a elements, which are now operating passively to convert the reflected acoustic pulse back into an electrical signal. A portion of the acoustic pulse that has not reflected off of the object of interest continues to travel deeper into the patient, where it reflects off of other discontinuities in the area of interest. This reflected acoustic energy returns along the path illustrated by the phantom line from point b to the passive row 14b elements. Similarly, reflected acoustic pulse energy from even deeper into the patient returns to the passive row 14c elements along the phantom line from point c.

It should be apparent that the information recovered at each of the respective rows 14a, 14b, 14c is slightly different, and the reflected pulse arrives at row 14a first in time, and arrives at rows 14b and 14c subsequently thereafter. This time difference between the pulse arrival at rows 14a, 14b, 14c diminishes as the ultrasound reflection point moves deeper into the patient. For this reason, the outer rows are used primarily at the deeper depths; otherwise, the reflected energy from a particular point along the directed ultrasound beam would not correlate and thus would not correctly sum together.

Figure 3:
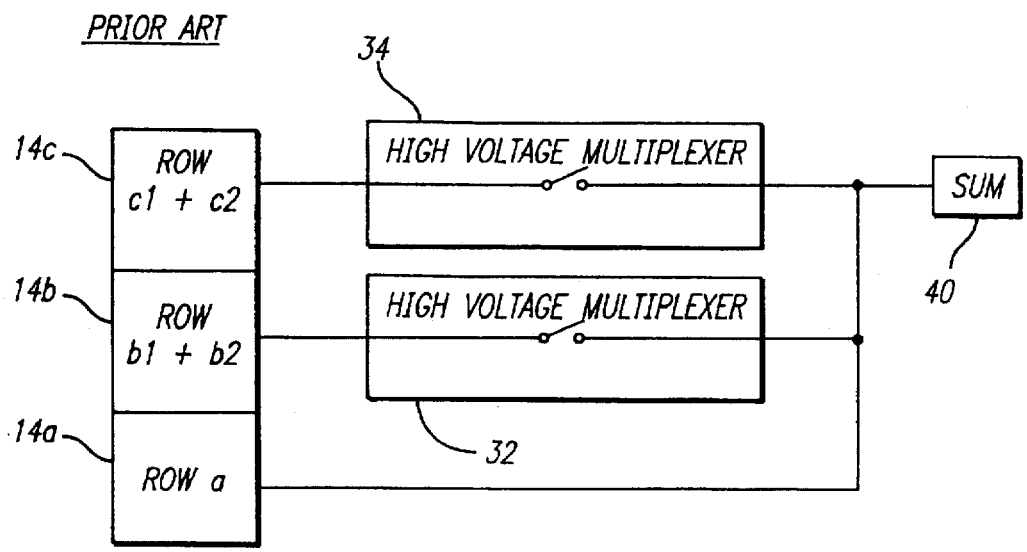
FIG. 3 is a block diagram of a prior art receive aperture control system.

Referring now to FIG. 3, a prior art receive aperture control system is illustrated. The control system illustrated in FIG. 3 may be disposed within the transducer 12 or the receiver 22, or may be distributed between these two structural elements. The control system includes a pair of high voltage multiplexers 32, 34 coupled to the row 14b, 14c elements, respectively. For a given transducer element within a respective one of the rows, the multiplexers 32, 34 appear as a pair of switches that are controlled by an externally generated control signal (not shown). Actually, the multiplexers 32, 34 include a plurality of such switches that correspond respectively to the individual piezoelectric elements of the respective rows 14b, 14c. In the description that follows, signals associated with a single one of the piezoelectric elements of each respective row 14a, 14b, 14c will be described, but it should be appreciated that similar processing occurs for signals to all of the elements of the rows.

The signals from each of the rows 14a, 14b, 14c that passes through the high voltage multiplexers 32, 34 are combined at a summing device 40. While the summing device 40 is illustrated as a distinct circuit element, in practice the signals may simply sum passively as they are being routed onto a common bus to the receiver. Closing of the switches within the high voltage multiplexers 32, 34 permits an electrical signal at respective ones of the rows 14b, 14c to travel to the summing device 40, which sums the signals from each of the rows. The timing of closure of the switches within a particular one of the multiplexers 32, 34 will correspond to the timing of signals provided to respective ones of the active row 14a elements. In practice, a signal timing single drives the closure of all the switches within a particular one of the multiplexers 32, 34 for a particular row of elements. By contrast, the timing of closure of the switches of the multiplexers 32, 34 relative to each other determines the elevation imaging depth, as described below. The high voltage multiplexers 32, 34 comprise analog transistors that are capable of withstanding a large voltage differential between the respective gate, source and drain terminals. As noted above, these electronic components change state relatively slowly and produce a very large transient or "glitch" when they close.

To generate a 1.5D image, multiple firings of the active transducer row 14a elements are performed. These firings may occur in any sequence, and in fact, may do so in order to conserve electrical power. In a first firing of the elements on active row 14a, both of the high voltage multiplexers 32, 34 are in the open state. An echo return signal to the row 14a element are converted to electrical signals which pass to the summing device 40. Next, row 14a is fired a second time with the high voltage multiplexer 32 closing shortly thereafter and the high voltage multiplexer 34 remaining in an open state. The echo return signal received at row 14b is then converted to an electrical signal that passes through the high voltage multiplexer 32 to the summing device 40, where it is combined with the signal received during the previous firing. Although the signal from row 14b will have a very bright artifact due to the switching glitch caused by the closing of the high voltage multiplexer 32, any information lost during the period of the switching glitch is recovered from the information received during the previous firing. Next, the row 14a is fired a third time with the high voltage multiplexer 34 and the high voltage multiplexer 32 closing shortly thereafter. As in the second firing, a bright artifact is formed due to the glitch caused by the closing of the high voltage multiplexers 32, 34, but any lost information is recovered from the information obtained during the previous two firings. Accordingly, the net signal produced by the three firings includes information from three distinct elevations of the imaging object, and is not disturbed by any of the glitches from the high voltage multiplexers 32, 34.

Figure 4:
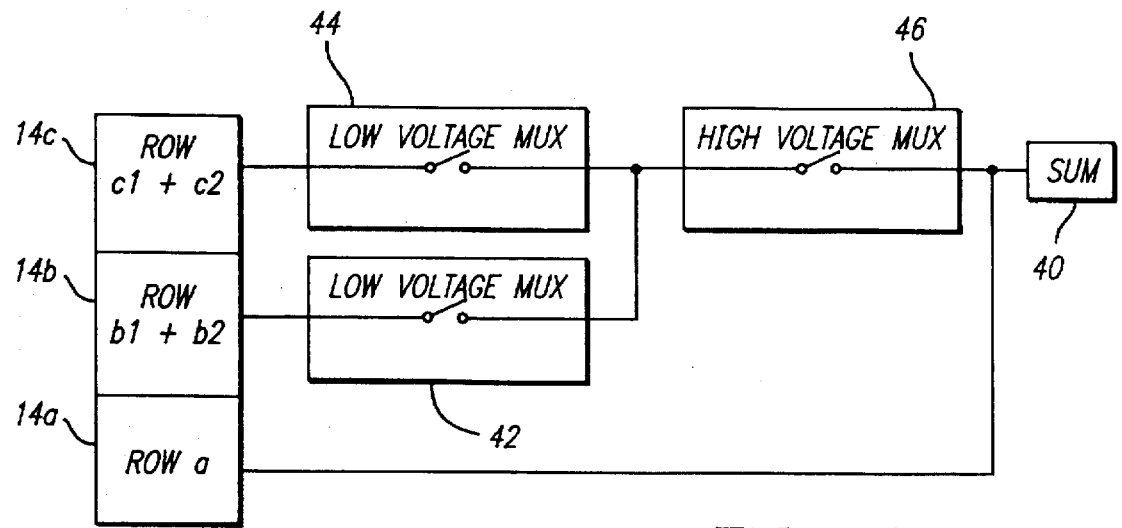
FIG. 4 is a block diagram of a receive aperture control system of the invention.

As noted above, the prior art receive aperture control system has a significant drawback in that it requires three separate firings of the elements of row 14a in order to accumulate the necessary elevational information. Referring now to FIG. 4, a receive aperture control system of this invention is illustrated that overcomes this inadequacy of the prior art. As with the prior art receive aperture control system of FIG. 3, the control system of the invention may be disposed within the transducer 12 or the receiver 22, or may be distributed between these two structural elements.

Particularly, the receive aperture control system comprises a single high voltage multiplexer 46 coupled in series with a pair (or multiplicity) of parallel-connected low voltage multiplexers 42, 44. The low voltage multiplexers 42, 44 are coupled to the elements of rows 14b, 14c, respectively. The low voltage multiplexers are capable of switching at a much faster rate than the high voltage multiplexers of the prior art, with much less of a switching glitch. Notwithstanding this benefit, the low voltage multiplexers are far less robust than the high voltage multiplexers, and are not capable of withstanding the high voltage differential produced by firing of the active row elements 14a. Accordingly, the high voltage multiplexer 46 is used to protect the low voltage multiplexers 42, 44, and the low voltage multiplexers are used for dynamic control of the receive aperture, as will be further described below.

During an imaging operation, the elements of the active row 14a are fired a single time. The high voltage multiplexer 46 remains in an open state during the firing, but closes shortly thereafter. Then, the low voltage multiplexers 42 and 44 close in a sequential manner to permit return signals from rows 14b and 14c to pass through to the summing device 40. Accordingly, the summing device 40 receives information from each of the three elevational rows 14a, 14b, 14c generated during the single firing of the active row 14a, without any glitches that would otherwise degrade the received information.

Figure 5:
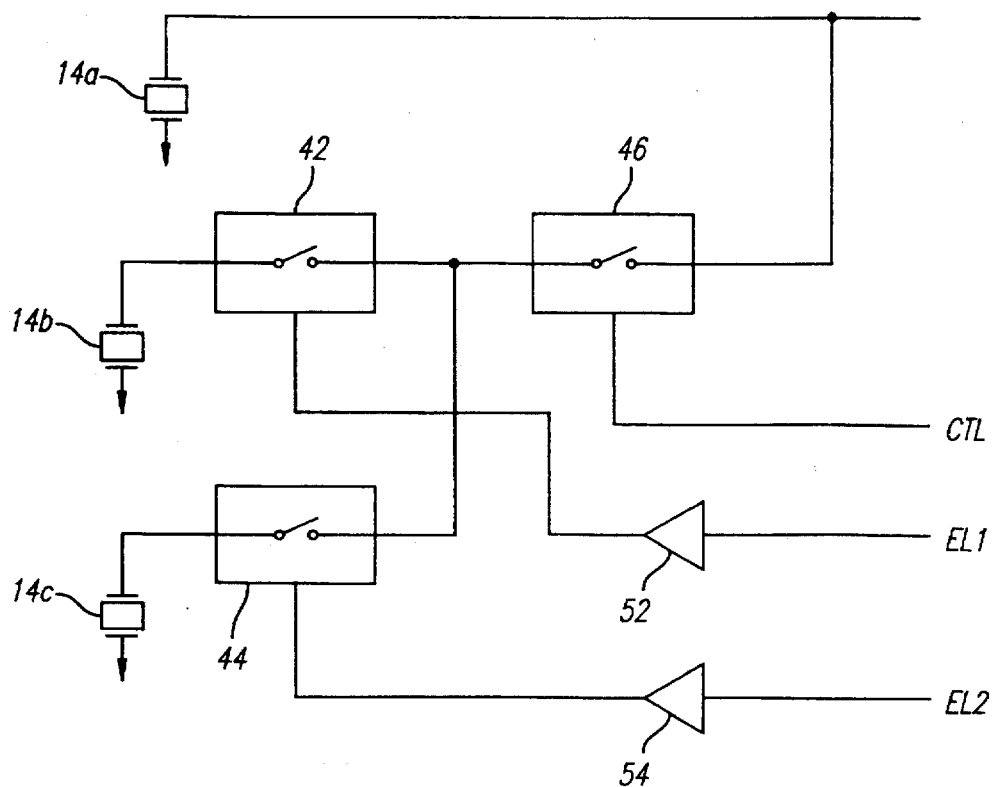
FIG. 5 is a schematic diagram of the receive aperture control system of FIG. 4.

FIG. 5 illustrates the receive aperture control system in additional detail. Individual piezoelectric elements of the respective rows 14a, 14b, 14c are illustrated as having a first electrode coupled to ground and a second electrode coupled into the receive path. The low voltage multiplexers 42, 44 are triggered by respective driver circuits 52, 54, that receive respective control signals EL1, EL2. The high voltage multiplexer 46 also received a control signal (identified as CTL in FIG. 5) that triggers a state change of the high voltage multiplexer.

Figure 6:
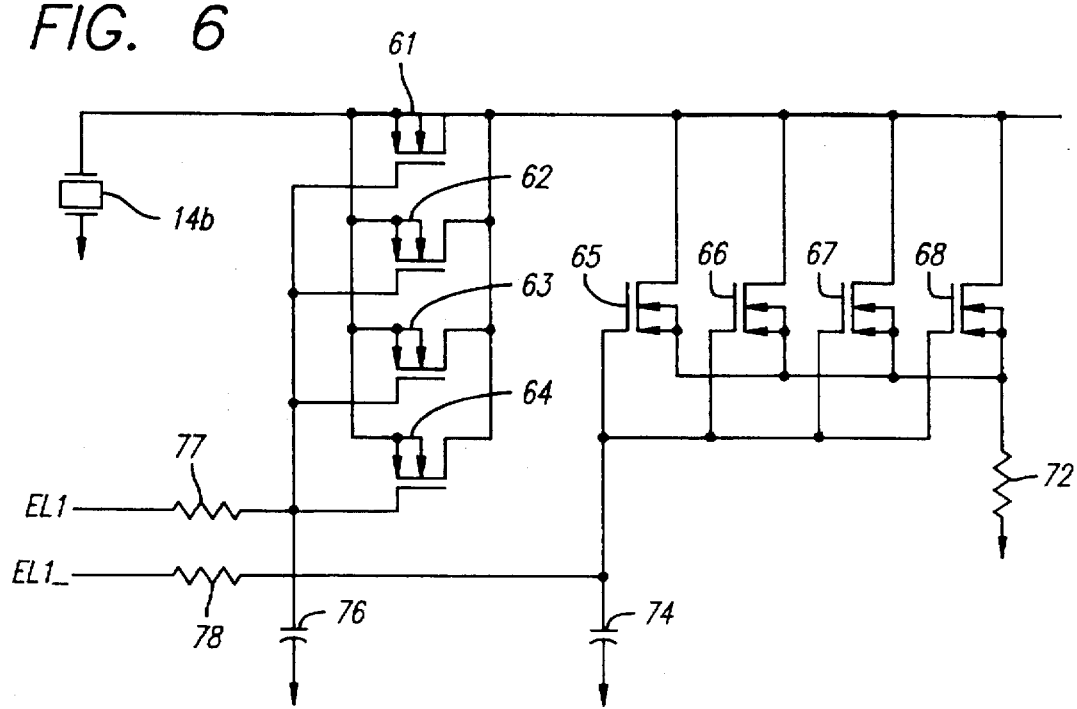
FIG. 6 is a schematic diagram of a low voltage switch within the receive aperture control system.

In FIG. 6, a single one of the low voltage multiplexers 42, 44 is illustrated in greater detail. For purposes of explanation, low voltage multiplexer 42 is illustrated, but it should be appreciated that the low voltage multiplexers 42, 44 are substantially identical. The low voltage multiplexer 42 further comprises a signal pass element comprising a plurality of parallel-coupled field effect transistors (FETs) 61–64, and a complimentary charge injection element also comprising a plurality of parallel-coupled FETs 65–68. The gates of the signal pass element FETs 61–64 are each coupled to the drive signal EL1 through a resistor 77. Similarly, the gates of the complimentary charge injection element FETs 65–68 are driven by the compliment of the drive signal EL1_ through a resistor 78. The sources of the signal pass element FETs 61–64 are coupled together and to the electrode element of the passive row 14b. The drains of the signal pass element FETs 61–64 are coupled together and are coupled to the drains of the complimentary charge injection element FETs 65–68. Capacitors 74, 76 are coupled between the respective gates of the complimentary charge injection element FETs 65–68 and the signal pass element FETs 61–64, respectively. The capacitors 74, 76 provide filtering of the switch transition glitch.

By utilizing four FET elements in parallel on both the signal pass switch and the complimentary charge injection element, the on-resistance of the entire switch is reduced substantially. For example, the on-resistance may be reduced from 60 ohms to 15 ohms. Moreover, the switching characteristics of the plurality of switches are averaged together to provide more uniform performance. As a result, switching glitch produced by the low voltage switch is lowered for a substantial improvement in overall system gain.

The resistor-capacitor (RC) networks formed by the coupled resistor 77/capacitor 76 and resistor 78/capacitor 74, could be replaced by characteristic matching networks. These matching networks could be configured to produce a characteristic RC charge/discharge curve having a slope amplitude and DC offset tuned to match the FETs that are being switched. Typically, the complimentary FETs 65–68 require a slightly larger amplitude to suppress the charge injection of the signal pass element FETs 61–64. The DC offset is changed to adjust in time the compensation crossover point. The gain is increased to force the amplitude of the charge injection.

In operation, the signal pass element FETs 61–64 driver circuit 52 is set to a point where the switch is just barely off, and when turned on, the circuit maximum voltage is such that the signal pass elements just reach saturation, i.e., minimum on-resistance. By adjusting the slope of the RC charge/discharge curve, the severity of the charge injection characteristic is controlled at the expense of an increased turn-on time. This negative characteristic is offset by an initially very reduced charge injection anomaly.

In a preferred embodiment, the driver circuits 52, 54 may further comprise active elements provided within a single integrated circuit as the FETs 61–68. Such a construction would yield certain distinct manufacturing advantages. First, the total number of discrete components are reduced. Second, a common driver circuit can drive all the switch elements. Third, the need to custom trim each signal pass element and complementary charge injection element would be unnecessary.

The invention is further defined by the following claims. What is claimed is:

1. An imaging system, comprising:
   a transducer having a linear array of piezoelectric elements arranged in a plurality of distinct rows of said elements, said transducer being operable to provide acoustic pulses from elements of a first one of said rows in response to respective driving signals and to provide corresponding return signals in response thereto at elements of additional ones of said plurality of said rows and at said first one of said rows;
   a receiver adapted to receive a summed signal from said corresponding return signals of said elements;
   a processor coupled to said receiver and said transducer to provide a 1.5D image from a plurality of said summed signals; and
   switch means for coupling said transducer to said receiver, said switch means comprising a first switch element coupled to respective ones of said additional ones of said plurality of said rows, and a second switch element coupled between said first switch element and said receiver.

2. The imaging system of claim 1, further comprising means for controlling timing of said switching means.

3. The imaging system of claim 2, wherein said controlling means further comprises an active network.

4. The imaging system of claim 1, wherein said first switch element further comprises a plurality of parallel-coupled field effect transistors.

5. The imaging system of claim 1, wherein said first switch element further comprises a signal pass element and a complimentary charge injection element coupled in series.

6. The imaging system of claim 5, wherein said signal pass element further comprises a plurality of parallel-coupled field effect transistors driven by an elevation signal.

7. The imaging system of claim 6, wherein said complimentary charge injection element further comprises a plurality of parallel-coupled field effect transistors driven by a complement of said elevation signal.

8. The imaging system of claim 1, further comprising a transmitter coupled to said transducer to provide said respective driving signals.

9. The imaging system of claim 1, wherein said first switch element further comprises a low voltage analog switch associated with each one of said additional ones of said plurality of said rows.

10. The imaging system of claim 1, wherein said second switch element further comprises a high voltage analog switch.

11. In an imaging system comprising a transducer having a linear array of piezoelectric elements arranged in a plurality of distinct rows of said elements, a method for providing a 1.5D image comprises the steps of:
   emitting a set of acoustic pulses from respective elements of a first one of said rows in response to respective driving signals;
   receiving corresponding return signals in response to said set of acoustic pulses at elements of additional ones of said plurality of said rows and at said first one of said rows;
   coupling said return signals from said additional ones of said plurality of said rows and said first one of said rows into a receive path of said imaging system by controlling a plurality of first switches and a second switch disposed in series with said plurality of first switches; and forming a 1.5D image from a beamformed sum of said return signals.

12. The method of claim 11, wherein said coupling step further comprises the step of closing said second switch after completion of said emitting step.

13. The method of claim 12, wherein said coupling step further comprises the step of closing respective ones of said first switches in a sequential manner during said receiving step and subsequent to closing of said second switch.

14. The method of claim 12, further comprising the step of controlling timing of closing of said first switches.

* * * * *